United States Patent
Zhai et al.

(10) Patent No.: US 10,810,374 B2
(45) Date of Patent: Oct. 20, 2020

(54) MATCHING A QUERY TO A SET OF SENTENCES USING A MULTIDIMENSIONAL RELEVANCY DETERMINATION

(71) Applicant: Baidu USA LLC, Sunnyvale, CA (US)

(72) Inventors: Jing Zhai, Sunnyvale, CA (US); Richard Chun-Ching Wang, Sunnyvale, CA (US); Weide Zhang, Santa Clara, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 289 days.

(21) Appl. No.: 15/227,750

(22) Filed: Aug. 3, 2016

(65) Prior Publication Data

US 2018/0039690 A1     Feb. 8, 2018

(51) Int. Cl.
*G06F 40/289*     (2020.01)
*G06F 40/284*     (2020.01)

(52) U.S. Cl.
CPC .......... *G06F 40/289* (2020.01); *G06F 40/284* (2020.01)

(58) Field of Classification Search
USPC .......................................................... 707/728
See application file for complete search history.

(56) References Cited

U.S. PATENT DOCUMENTS

| | | | | |
|---|---|---|---|---|
| 2011/0219012 A1* | 9/2011 | Yih | ...................... | G06F 15/18 707/749 |
| 2012/0323877 A1* | 12/2012 | Ray et al. | ............... | G06F 17/30 707/706 |
| 2013/0275122 A1* | 10/2013 | Park | ...................... | G06F 17/28 704/9 |
| 2014/0052688 A1* | 2/2014 | Bansal | ..................... | G06N 7/02 706/52 |
| 2014/0236941 A1* | 8/2014 | Johns | ................ | G06F 17/30873 707/730 |
| 2017/0109449 A1* | 2/2017 | Johns et al. | ............ | G06F 17/30 |

* cited by examiner

*Primary Examiner* — Muluemebet Gurmu
(74) *Attorney, Agent, or Firm* — Womble Bond Dickinson (US) LLP

(57) ABSTRACT

Described is a system that matches a query with a set of sentences. When a query is received, the system may extract features from the query including one or more words as tokens and retrieve a set of candidate sentences as potential results for the query. For example, the query may be in the form of a question, and the candidate sentences may be alternative phrasings of the query that potentially match the user's search intent. The relevant set of candidate sentences may be determined based on using multiple relevancy scores and the system may rank the candidates according to an overall or aggregate score. Accordingly, the set of results to a query may be provided by recognizing the sentence as a whole and, for example when the query is a question, the interrogative intent of the query.

18 Claims, 8 Drawing Sheets

MATCHING A QUERY TO A SET OF SENTENCES USING A MULTIDIMENSIONAL RELEVANCY DETERMINATION

FIELD OF THE INVENTION

Embodiments of the present disclosure relate to providing query results. More particularly, embodiments relate to providing sentences as query results using multiple relevancy determinations.

BACKGROUND

Most search providers typically receive a search term entered by a user and retrieve a search result list, usually Web pages, associated with the search term. The search engine may display the search results as a series of subsets of a search list based on certain criteria. Some of the user's interactions with the search results or user information may be monitored and collected by the search provider to improve subsequent searches. Even with the information collected, search results may not always be suitable or aligned with a user's expectations in certain contexts. For example, search providers often enable users to perform searches based on phrases or sentences.

Typical search providers, however, often match query terms with keywords, which often do not reflect the real intent of the search query when presented as a sentence. For example, when a query includes a sentence in the form of a question, the search results may provide results that merely include particular keywords of the sentence without appropriately accounting for the context or the intent of the query. Accordingly, results are often provided based on analyzing groups of keywords without taking into account the dynamics of the entire phrase or sentence. Accordingly, it is often the case that when searching using a more complicated series of terms, such as when the search query is a question, the results often do not match the user's expectations.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments. In addition, reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

In one embodiment, described is a system that aims to more effectively understand search queries that may include a more complicated structure such as phrases or sentences. In one example, the system may provide results by matching the query that is in the form of an interrogative sentence (e.g. a question) with a set of candidate sentences. These candidate sentences may be intended, equivalent, or alternative phrasings of the query that potentially match the user's search intent. By determining the user's search intent, relevant content associated with the candidate sentences may be presented to the user.

Accordingly, in an effort to potentially produce more relevant search results, in one embodiment, the system may extract features to analyze sentences and match the query sentences with candidate sentences using a multidimensional relevancy determination mechanism. For example, in one embodiment, features may be extracted from a set of candidate sentences during a pre-processing, and features may be extracted from a query sentence in a real-time processing. Accordingly, the set of candidate sentences (and features) may then be compared to the query sentence based on one or more relevancy determinations. The relevancy determinations may include determining various scores between the query and the set of candidate sentences and the system may rank the candidates according to an overall or aggregate score. Accordingly, a more relevant set of results to a query may be provided by performing a feature analysis and a relevancy analysis.

Figure 1:
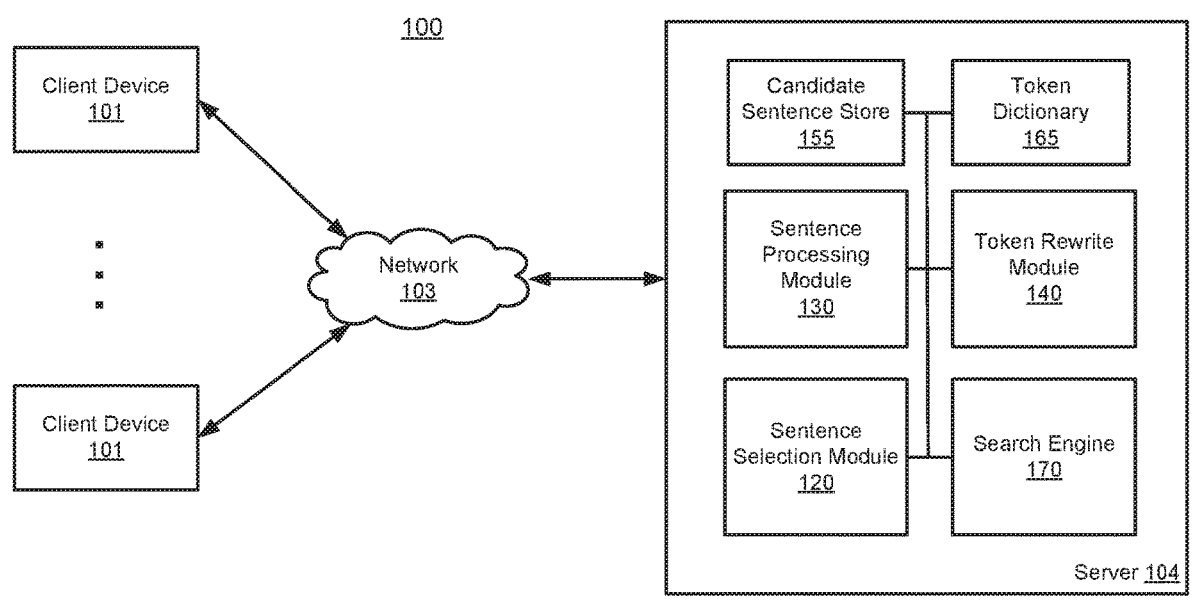
FIG. 1 is a block diagram illustrating an example system configuration according to an embodiment of the disclosure.

FIG. 1 is a block diagram illustrating an example system configuration according to an embodiment of the disclosure. The system 100 may include one or more client device(s) 101 communicatively coupled to server 104 via a network 103. Client device 101 (or client, or device) may be any type of computing device such as a personal computer (e.g. desktop, laptop, and tablet), a "thin" client, a personal digital assistant (PDA), a Web enabled appliance, a Smartwatch, or a mobile phone (e.g. Smartphone), etc. Network 103 may be any type of wired or wireless network such as a local area network (LAN), a wide area network (WAN) such as the Internet, or a combination thereof. Server 104 may be any kind of server or a cluster of servers and may include a Web or cloud-based server, application server, backend server, or a combination thereof. Server 104 may further include an interface (not shown) to allow devices (e.g. client device 101) to access resources or services provided by server 104. The interface may include a Web interface, an application programming interface (API), and/or a command line interface (CLI).

In one embodiment, the server 104 may include a sentence selection module 120, a sentence processing module 130, a token rewrite module 140, a candidate sentences store 155, a token dictionary 165, and a search engine 170.

The sentence processing module 130 may process candidate sentences and query sentences (e.g. sentences included as part of a query). In one embodiment, the processing of candidate sentences may occur as a pre-processing. The candidate sentences may be derived from various sources. For example, the candidate sentences may be derived from previous searches, manually entered sentences, sentences created from a combination of keywords, and sentences created from a trained model. In addition, the candidate sentences may be associated with various types of content that may be presented to the user. For example, in the context of a question relating to a potential health ailment, the user may be provided with content related to treating the ailment, referrals to health providers, treatment products, etc.

The candidate sentences and information derived from processing of the candidate sentences (e.g. extracted features) may be stored in a candidate sentence store 155. For example, the information derived from the candidate sentences may be stored as part of an index. In one embodiment, the index may be structured as an inverted index table.

The sentence selection module 120 may perform operations to select and rank candidate sentences as further discussed herein. The token rewrite module 140 may determine similar words to the tokens extracted from a sentence as further discussed herein. When determining similar words, the token rewrite module may refer to a token dictionary 165. The token dictionary 165 may be built from various sources including previous searches, manually entered sources, keywords derived from a trained model, or other suitable manner.

The server 104 may also include a search engine 170. It should be noted that the components described above, may be part of, or work in conjunction with, a search engine 170. Search engine 170 may include a Web search engine that is designed to search for information on the World Wide Web. The search engine 170 may be an existing engine such as a Baidu® search engine available from Baidu, Inc. or alternatively, search engine 170 may represent a Google® search engine, a Microsoft Bing™ search engine, a Yahoo® search engine, or another type of search engine. Search engine 170 may provide a search result (or query result) based on selected candidate sentences and provide data associated with the candidate sentences such as a mix of Web pages, images, and other types of files.

The search engine 170 may also maintain real-time information by running an algorithm (e.g. a web crawler) to maintain an index. For example, when a user enters a query into a search engine (typically by using keywords), the engine examines its index and provides a listing of results. As further described herein, when a query is received, a candidate sentence associated with the query may be determined in real-time by the sentence selection module 120 and provided as part of a search result. For example, in response to a query, the search engine 170 may integrate a candidate sentence as part of a search result. It should also be noted that search engine 170 may employ various techniques to provide search results, and embodiments herein may be combined with these techniques to provide search results.

With respect to the configuration of system 100, other architectures or configurations may also be applicable. For example, candidate sentence store 145 or token dictionary 165 may be maintained and hosted in a separate server as a content server over a network. Such a content server or additional servers may be organized and provided by the same provider or organization as of server 104. Alternatively, such a content server or additional servers may be maintained or hosted by separate providers or organizations (e.g., third-party providers), which are responsible for managing content in content databases.

Figure 2:
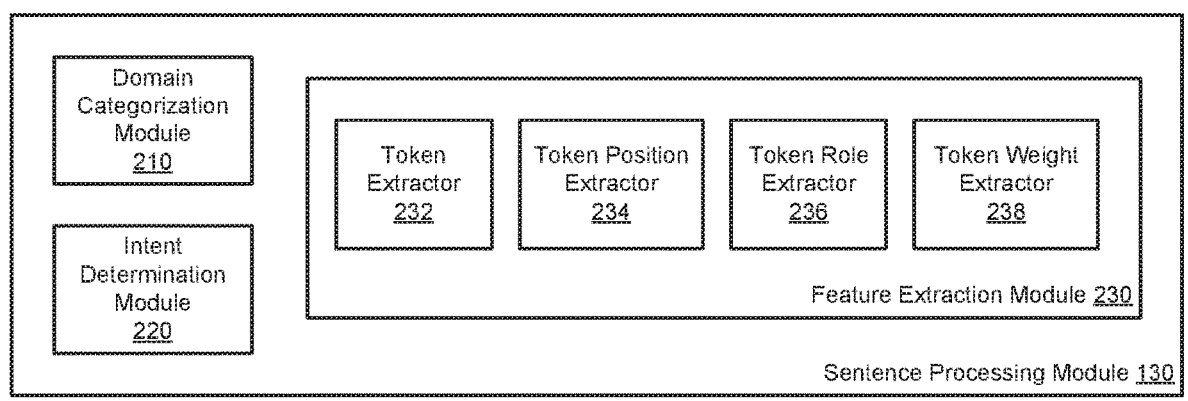
FIG. 2 is a block diagram illustrating components of a sentence processing module according to an embodiment of the disclosure.

FIG. 2 is a block diagram illustrating components of a sentence processing module according to an embodiment of the disclosure. As described above, the sentence processing module 130 may perform various operations, which may be performed by various modules, to process candidate sentences and sentences received as part of a query. These modules may include a domain categorization module 210, an intent determination module 220, and a feature extraction module 230.

The domain categorization module 210 may determine one or more categories that correspond to a sentence (e.g. query sentence or candidate sentence). These categories may be predetermined, or may be dynamically created by the system. The categories may include general categories based on the context of the sentence. For example, categories may include topics such as medical, entertainment, sports, etc. Accordingly, the domain categorization module 210 may provide an initial layer of context for the sentence.

The intent determination module 220 may determine an intent for the sentence. For example, the system may perform a semantic analysis on the sentence to determine contextual information including the intent of the sentence. In one embodiment, the system may determine an interrogative intent of a sentence. For example, in the context of the sentence being a health-related question, the system may determine whether the intent relates to determining a treatment, specific disease, medical facility or department, medication, price of medication, etc. In addition, the intent categories may be predefined or may be determined dynamically by the system. For example, the system may determine particular categories of intent in conjunction with the determined domain category. Accordingly, determining the intent may provide an additional layer of context for the sentence.

When processing a sentence, the feature extraction module 230 may extract features from a query including a sentence of one or more words. The one or more words of the query may form a phrase, clause, or a sentence. For example, it is not uncommon for a user to enter a partial sentence. For example, instead of entering "what medication should a pregnant woman take for a headache?" (i.e. a full sentence), the user may just enter "medication for headache pregnant woman" (i.e. a partial sentence). Accordingly, the system may account for both of these scenarios as each query may be processed as a sentence (despite the latter example not necessarily being a "complete" or "proper" sentence under grammatical rules or constructs). Accordingly, in one embodiment, a sentence may include one or more words, phrases, clauses, or a full or partial sentence. In addition, the sentence may be an interrogative sentence (e.g. a sentence in the form of a question) as shown in the example above. In addition, the system may determine that the sentence is an interrogative sentence based on the sentence structure, the inclusion of the "?" character, or other criteria. For example, in one embodiment, the system may initiate the processing (and operations) as described herein in response to determining that the sentence is an interrogative sentence. Accordingly, in such an embodiment, the system may perform various processing schemes in response to determining whether the sentence is an interrogative sentence.

Feature extraction module 230 may include one or more extractors (e.g. modules). In one embodiment, the system (e.g. token extractor 232) may extract one or more words of a query as tokens. In addition, the system may extract features related to the tokens. For example, the system may extract a position of the token (e.g. via a token position extractor 234), extract a role of the token (e.g. via a token role extractor 236), and extract a weighting of the token (e.g. via a token weight extractor 238). These features may be extracted from a sentence or candidate sentence and aid in the semantic analysis of sentences as discussed further herein.

Figure 3:
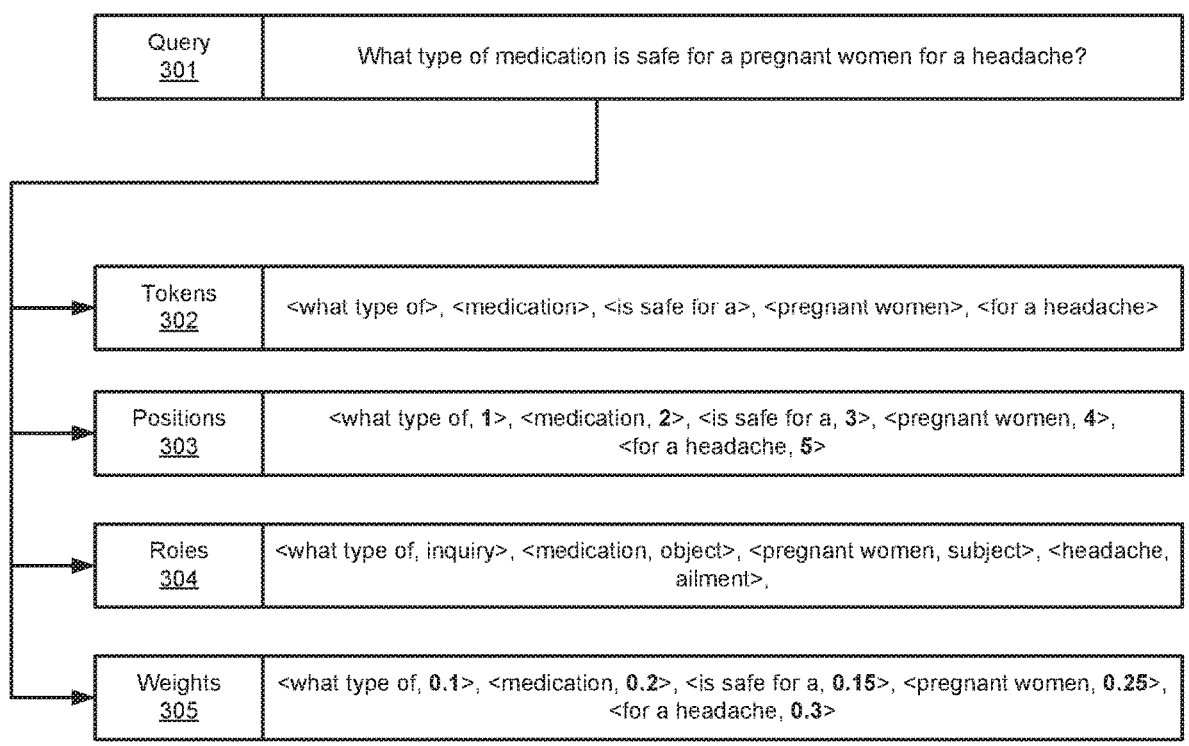
FIG. 3 is a diagram illustrating an example of extracted features from a sentence according to an embodiment of the disclosure.

FIG. 3 is a diagram illustrating an example of extracted features from a sentence according to an embodiment of the disclosure. As shown, the feature extraction process may begin with a sentence (or candidate sentence), which in this example is provided as a query 301. For example, as shown in this example, the query may include an interrogative sentence such as "what type of medication is safe for a pregnant woman for a headache?" The system may then extract tokens 302 which correspond to one or more words of the sentence. As shown, the one or more words may be grouped based on the type of words as they relate to the structure of the sentence. In addition, the system may determine positions 303 of the tokens. For example, as shown the tokens may correspond to a token order (e.g. position 1, 2, 3, etc.). It should be noted that other forms of positioning may also be included such as a position that accounts for the number of words or relative position within the sentence. The system may also determine roles 304 of the tokens. For example, as shown the tokens may correspond to roles as they relate to components within a sentence such as whether the token is an object, subject, etc. Roles may also be determined based on various other criteria, including, for example, contextual criteria or roles based on a semantic analysis. The system may also determine weights 305 for the tokens. For example, as shown each token may be assigned with a weight (or importance weight) value. For instance, words that are deemed more important (e.g. have a greater influence on the intent or meaning of the sentence) may be assigned with a higher weighting. Moreover, a weighting value may also be responsive to a particular domain category. For example, if it is determined that the query (e.g. as in this example) is part of a medical domain, words specific to a medical element (e.g. headache) may be given a higher weighting value. It should be noted that any suitable weighting scheme may be used including, for example, a relative weighting scheme (e.g. wherein the sum of the weights equals 1) as shown in this example, or any other suitable weighting scheme.

Figure 4:
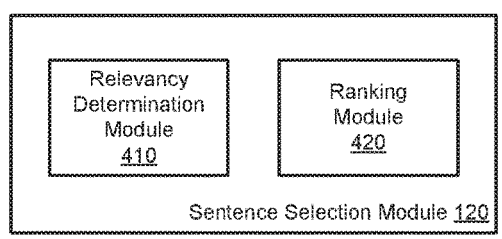
FIG. 4 is a block diagram illustrating components of a sentence selection module according to an embodiment of the disclosure.

FIG. 4 is a block diagram illustrating components of a sentence selection module according to an embodiment of the disclosure. The sentence selection module 120 may select (or match) a query with a set of candidate sentences. Accordingly, the sentence selection module 120 may include a relevancy determination module 410 and a ranking module 420. The ranking module 420 may rank the candidate sentences according to relevancy scores provided by the relevancy determination module 410. For example, the ranking module 420 may rank sentences from the most relevant to least relevant when presenting the candidate sentences or related content (e.g. webpages, products, medical services, etc.) as results to a query. In addition, the ranking may include selecting the most relevant (e.g. highest ranking) result.

Figure 5:
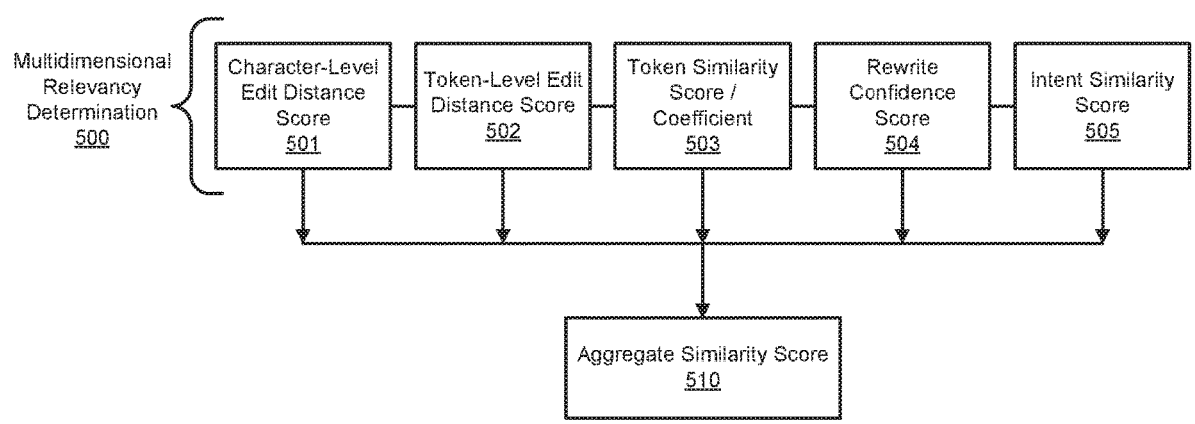
FIG. 5 is a diagram illustrating various relevancy determination techniques according to an embodiment of the disclosure.

As described, the relevancy (or similarity) may be determined based on one or more scores. FIG. 5 is a diagram illustrating various relevancy determination techniques according to an embodiment of the disclosure. As shown, the system may utilize a multidimensional relevancy determination 500, which may include various components. Embodiments may use various combinations of these determination techniques when determining an aggregate similarity score 510. These determination techniques may include a character-level edit distance score 501, a token-level edit distance score 502, a token similarity score/coefficient 503, a rewrite confidence score 504, and an intent similarity score 505.

The edit distance scores (501 and 502) may be calculated based on various techniques for measuring distance between two sequences (e.g. character strings). For example, the system may perform such calculations on a character-level 501 or on a token level 502. These edit distance calculations may use various techniques such as the Levenshtein distance, wherein the distance between two words is a minimum number of single character edits (e.g. insertions, deletions, or substitutions) required to change one word into the other. Other techniques that may also be used include a Longest Common Subsequence (LCS) distance (e.g. only insertion and deletion edits), a Hamming distance (e.g. only substitution edits), or a Jaro-Winkler distance (e.g. only transposition edits). As described above, these techniques may be used according to a character-level (e.g. single character edits) or a token-level (e.g. single token edits).

Token similarity score/coefficient 503 may determine the similarity between tokens (and associated features) of the sentence (e.g. query sentence) and tokens (and associated features) of each candidate sentence. For example, the tokens themselves may be compared, as well as the position, the role, the weight, and any other features, for example, that may be extracted from the sentences. In one embodiment, the coefficient may be determined using various techniques including a Dice similarity coefficient, a Jaccard similarity coefficient, or a Cosine similarity coefficient.

As further described herein, the system may determine token rewrites (or determine similar words for the tokens). Accordingly, a rewrite confidence score 504, for example, may calculate the similarity between the similar words and the tokens used for the candidate sentence. The system may also use an intent similarity score 505 that may measure the differences between the intent of the sentence and the intent of the candidate sentence. Accordingly, based on one or more of the relevancy scores, the aggregate similarity score 510 for the candidate sentence may be calculated. The aggregate similarity score 510 may be calculated using various techniques. In one embodiment, the aggregate similarity score 510 may be normalized, for example, by using a weighted sum of the determined relevancy scores.

Figure 6:
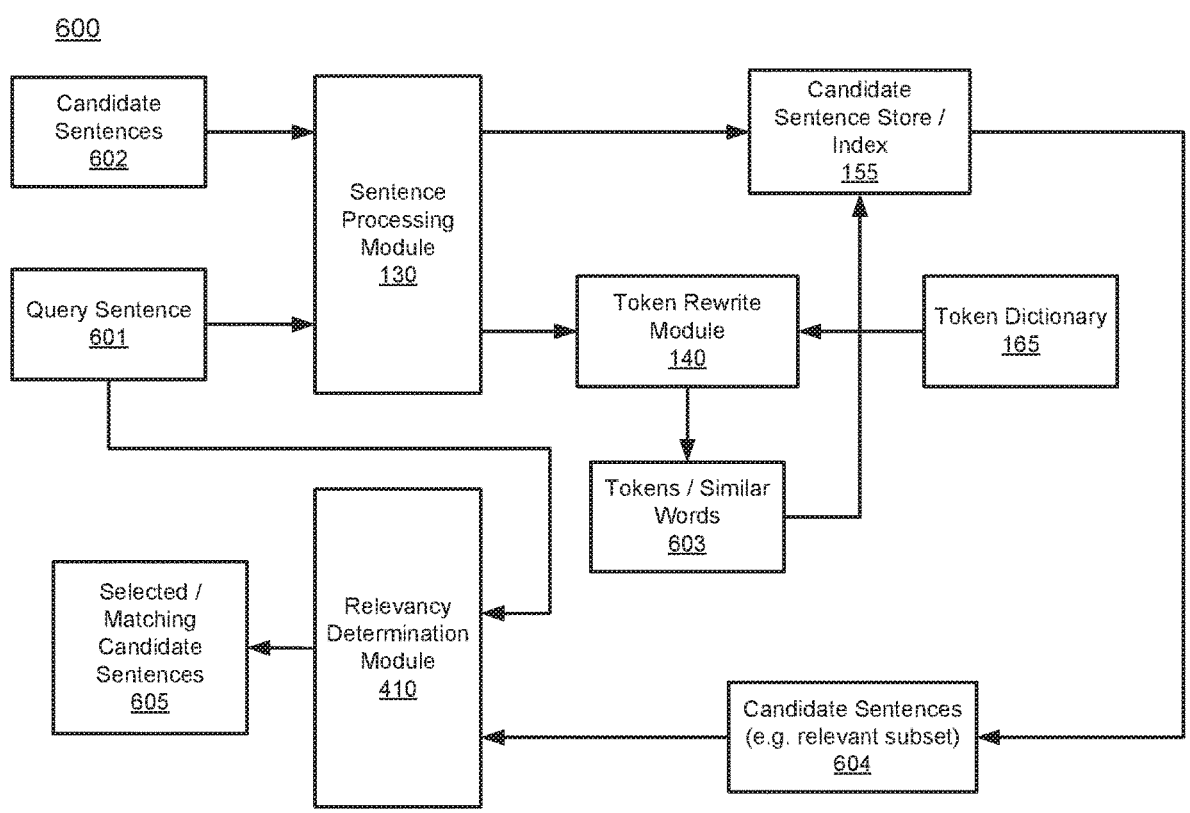
FIG. 6 is a process flow diagram illustrating the process of selecting candidate sentences according to an embodiment of the disclosure.

FIG. 6 is a process flow diagram illustrating the process of selecting candidate sentences according to an embodiment of the disclosure. As shown, process 600 may start with a query sentence 601 and candidate sentences 602 as described above. When a query sentence 601 is received, the sentence processing module 130 may process the sentence (e.g. determine a domain category, determine an intent for the sentence, or extract features). Candidate sentences 602 may also be processed, for example, as part of the pre-processing by the sentence processing module 130 (e.g. during an offline phase). The processing of the candidate sentences 602 (e.g. determine a domain category, determine an intent for the sentence, or extract features) may be similar to the query sentence 601 processing. Once the candidate sentences 602 are processed, they may be stored, along with the associated information resulting from the processing (e.g. domain, intent, tokens, token features), in the candidate score/index 155 (e.g. inverted index table).

Once the query sentence 601 has been processed, a token rewrite module 140 may analyze the tokens resulting from the processing to determine similar words (e.g. token rewrites), which may be derived from a token dictionary 165. In one embodiment, the token dictionary 165 may be derived or created from a trained model. The tokens/similar words 603 may be referenced with the candidate sentence store/index 155 (which may be loaded into memory during an online phase) to determine a set of candidate sentences 604. The relevancy determination module 410 may then perform various relevancy determinations (e.g. a multidimensional relevancy determination) by analyzing the candidate sentences 604 and the original query sentence 601. As described above, the relevancy determination module 410 may determine various scores, including an aggregate similarity score, to determine selected/matching candidate sentences 605 as a result for the query. In addition, the selected/matching candidate sentences 605 may also be ranked based on the similarity scores. Accordingly, the system may provide the results along with associated content to the user.

Figure 7:
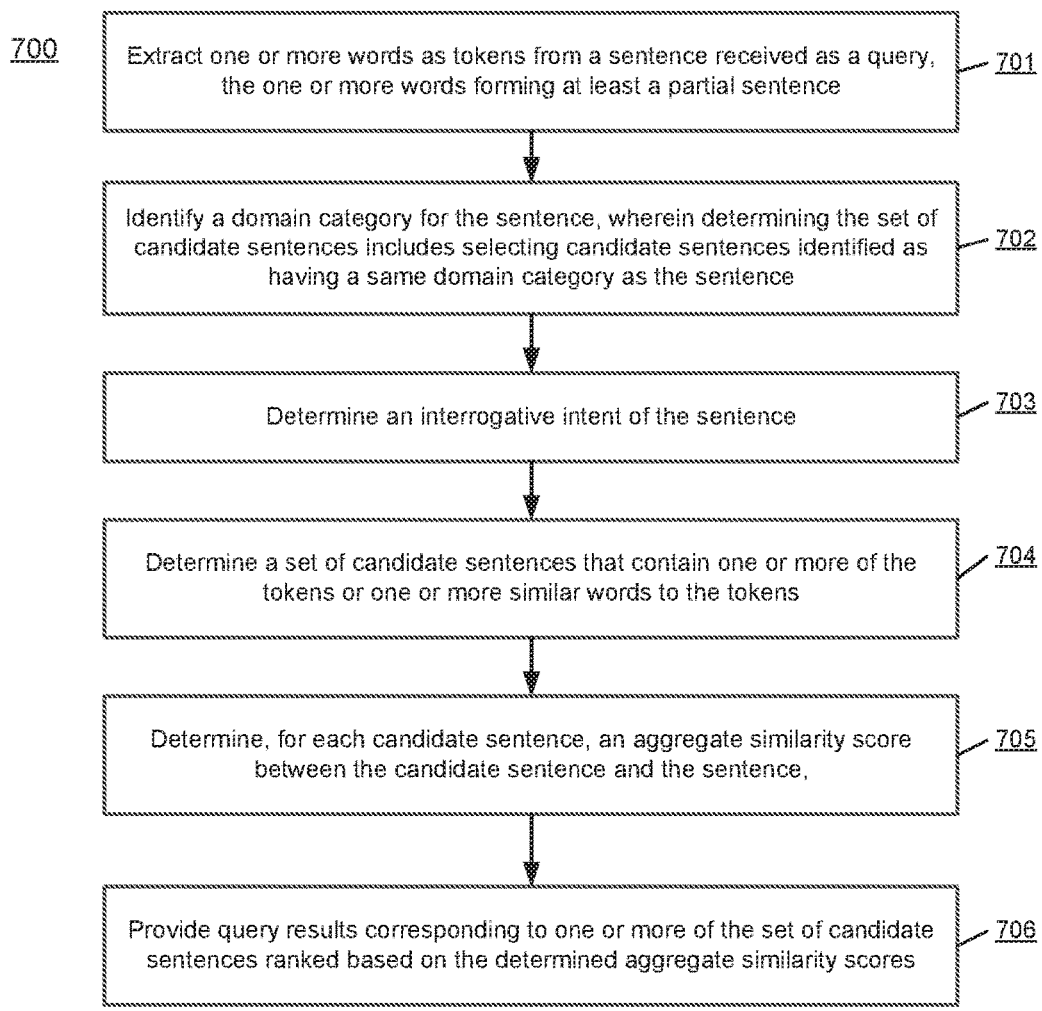
FIG. 7 is a flow diagram illustrating a method of processing a query and providing candidate sentences as results according to an embodiment of the disclosure.

FIG. 7 is a flow diagram illustrating a method of processing a query and providing candidate sentences as results according to an embodiment of the disclosure. Process 700 may use processing logic which may include software, hardware, or a combination thereof. For example, process 700 may be performed by a system (e.g. server 104). In block 701, the system may extract one or more words as tokens from a sentence received as a query, the sentence including one or more words forming at least a partial sentence. In one embodiment, the partial sentence may include one or more words, phrases, or clauses of an interrogative sentence.

In block 702, the system may identify a domain category for the sentence, wherein determining the set of candidate sentences includes selecting candidate sentences identified as having the same domain category as the sentence. In block 703, the system may determine an interrogative intent of the sentence. In block 704, the system may determine a set of candidate sentences that contain one or more of the tokens or one or more similar words to the tokens. In one embodiment, the set of candidate sentences may be determined from an index, and at least part of the index may be created from information obtained by processing each candidate sentence including extracting one or more words as tokens from each candidate sentence.

In block 705, the system may determine, for each candidate sentence, an aggregate similarity score between the candidate sentence and the sentence, wherein determining the aggregate similarity score includes determining a token similarity score between one or more tokens of the sentence and one or more corresponding tokens of the candidate sentence. In one embodiment, the token similarity score may be calculated as a Dice similarity coefficient, a Jaccard similarity coefficient, or a Cosine similarity coefficient. In one embodiment, extracting one or more words as tokens from the sentence and extracting one or more words as tokens from each candidate sentence may further include determining a position of each token within the sentence and the candidate sentence respectively. Accordingly, in such an embodiment, determining the token similarity score may include comparing the position of the one or more tokens of the sentence with the position of the one or more corresponding tokens of the candidate sentence. In addition, in one embodiment, extracting one or more words as tokens from the sentence may further include determining a role and an importance weighting of each token within the sentence. Accordingly, in such an embodiment, determining the token similarity coefficient score may include comparing the role and the importance weighting of the one or more tokens of the sentence with the role and the importance weighting of the one or more corresponding tokens of the candidate sentence.

As described above, embodiments may include one or more additional scores for determining an aggregate similarity score. For example, the determining the aggregate similarity score may further include determining a confidence score between the similar words and one or more corresponding tokens in the candidate sentence, and/or determining an intent similarity score between the determined interrogative intent for the sentence and a determined interrogative intent for the candidate sentence. In one embodiment, determining the intent category for the sentence and the candidate sentence may include performing a semantic analysis on the sentence and the candidate sentence respectively.

In addition, determining the similarity score may further include determining an edit distance score between one or more tokens of the sentence and the one or more corresponding tokens of the candidate sentence. In one embodiment, determining the edit distance score may include determining a character-level edit distance between characters of the one or more tokens of the sentence and characters of the one or more corresponding tokens of the candidate sentence, and/or determining a token-level edit distance between the tokens of the sentence and the tokens of the candidate sentence. Various calculations and techniques may be used to determine the edit distance. For example, as described above, edit distances may be calculated using one or more of a Levenshtein distance, a Longest Common Subsequence (LCS) distance, a Hamming distance, or a Jaro-Winkler distance.

In block 706, the system may provide query results corresponding to one or more of the set of candidate sentences ranked based on the determined aggregate similarity scores. The query results may be provided in any number of ways including displaying a list of alternative phrasings for the sentence (e.g. a corrected or more popular phrasing of a question). For example, a user may click on this alternative phrasing, which in turn provides search results.

Figure 8:
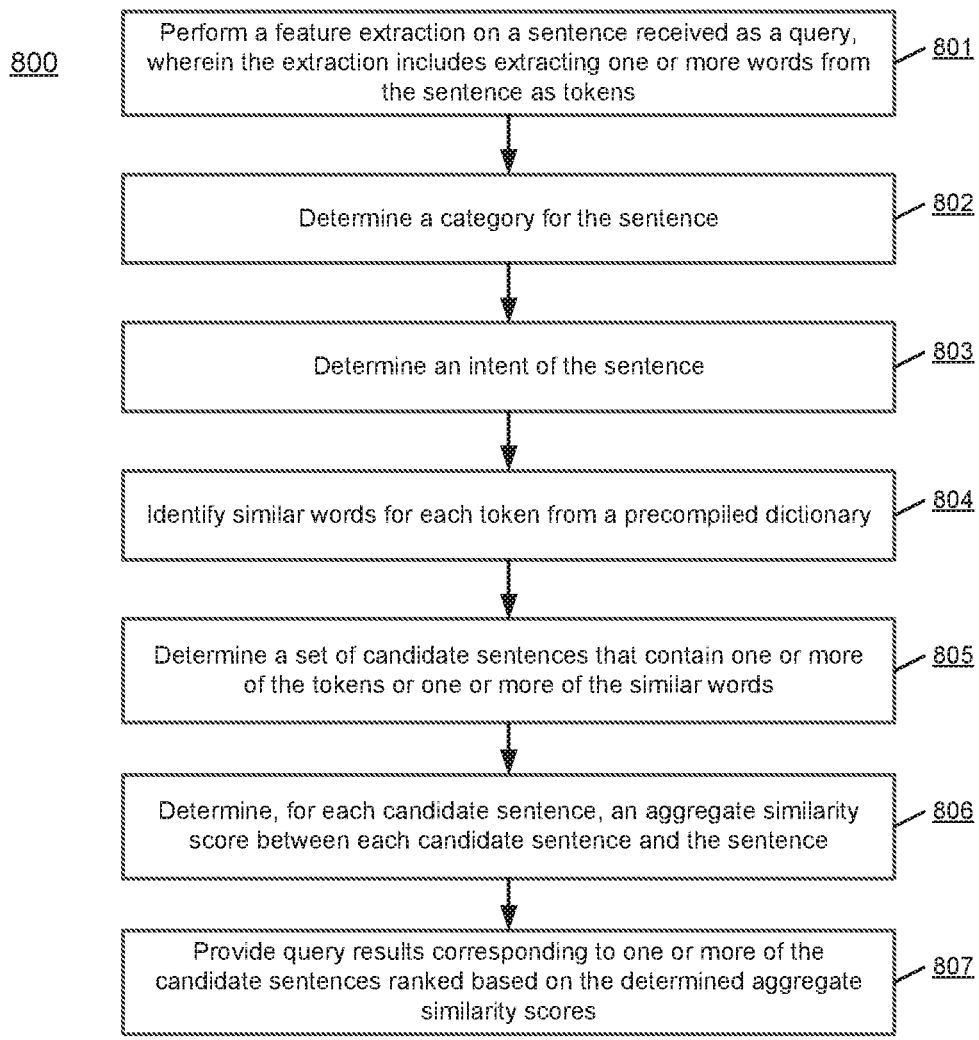
FIG. 8 is a flow diagram illustrating a method of selecting candidate sentences using a multidimensional relevancy determination according to an embodiment of the disclosure.

FIG. 8 is a flow diagram illustrating a method of selecting candidate sentences using a multidimensional relevancy determination according to an embodiment of the disclosure. Process 800 may use processing logic which may include software, hardware, or a combination thereof. For example, process 800 may be performed by a system (e.g. server 104). In block 801, the system may perform a feature extraction on an interrogative sentence received as a query, the interrogative sentence may include one or more words forming at least a partial sentence, and the feature extraction may include extracting one or more of the words as tokens. In one embodiment, the system may also perform a feature extraction on a candidate sentence, and the feature extraction may also include extracting one or more words from the candidate sentence as tokens. In block 802, the system may determine a domain category for the sentence, and in block 803, the system may determine an intent of the sentence. In block 804, the system may identify similar words for each token from a precompiled dictionary. In block 805, the system may determine a set of candidate sentences that contain one or more of the tokens or one or more of the similar words. In one embodiment, the set of candidate sentences may be identified as having a same domain category as the sentence.

In block 806, the system may determine, for each candidate sentence, an aggregate similarity score between the candidate sentence and the sentence. In one embodiment, the determining the aggregate similarity score may include determining one or more of an edit distance score between one or more tokens of the sentence and one or more corresponding tokens of the candidate sentence, a token similarity score between one or more tokens of the sentence and one or more corresponding tokens of the candidate sentence, a confidence score between one or more of the similar words and one or more corresponding tokens of the candidate sentence, and an intent similarity score between the determined intent for the sentence and a determined intent for the candidate sentence. In block 807, the system may provide query results corresponding to one or more of the set of candidate sentences ranked based on the determined aggregate similarity scores.

It should be noted that there may be variations to the flow diagrams or the steps (or operations) described therein without departing from the embodiments described herein. For instance, the steps may be performed in parallel, simultaneously, a differing order, or steps may be added, deleted, or modified. In addition, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

Figure 9:
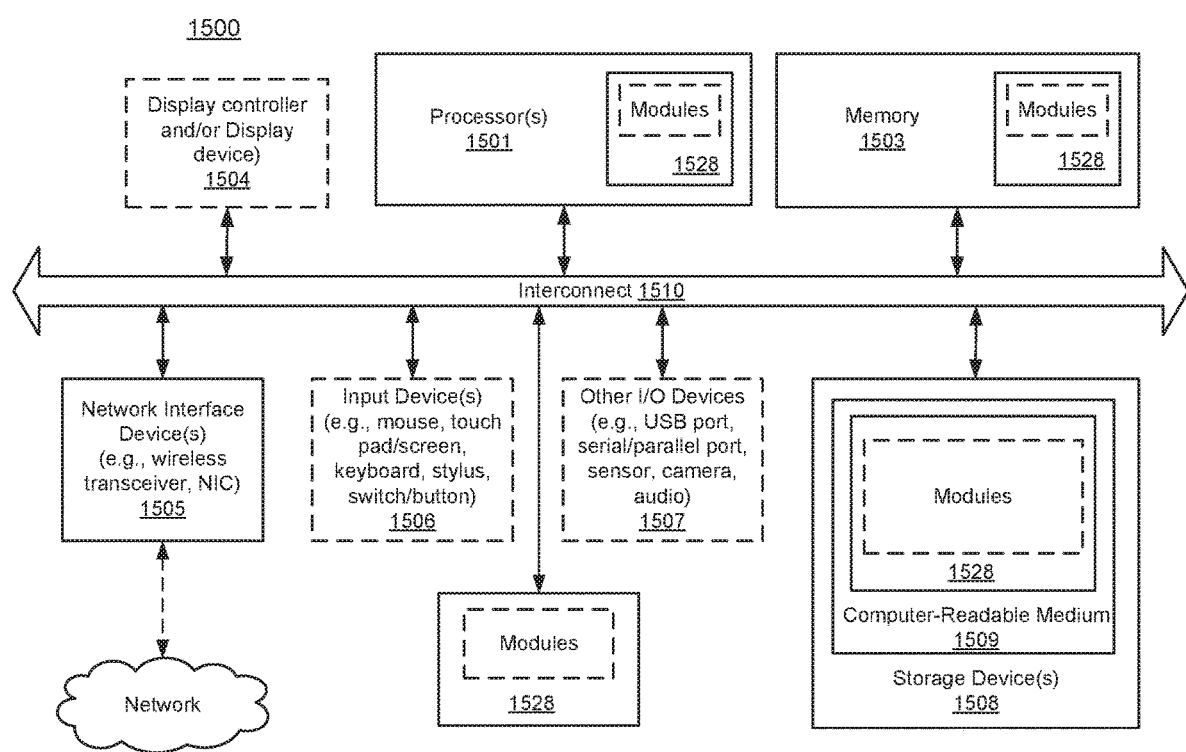
FIG. 9 is a block diagram illustrating an example computing device according to an embodiment of the disclosure.

FIG. 9 is a block diagram illustrating an example computing system according to an embodiment of the disclosure. For example, system 1500 may represents any of data processing systems described above performing any of the processes or methods described above, such as, for example, server 104 or client 101 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein.

Module/unit/logic 1528 may represent any of the components described above, such as, for example, a search engine, server modules such as the sentence selection module 120, sentence processing module 130, token rewrite module 140, etc. (and related modules and sub-modules). Module/unit/logic 1528 may also reside, completely or at least partially, within memory 1503 and/or within processor 1501 during execution thereof by data processing system 1500, memory 1503 and processor 1501 also constituting machine-accessible storage media. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; and phase-change memory).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   extracting one or more tokens from a sentence received by a search server as a query, each token comprising one or more words, the one or more words forming at least a partial sentence;
   determining, automatically, a domain category for the sentence;
   determining a set of candidate sentences having the same domain category as the sentence, wherein the candidate sentences contain one or more of the tokens or one or more similar words to the tokens, wherein the one or more tokens or one or more similar words of each candidate sentence comprise words specific to the domain category, wherein the set of candidate sentences are determined from an index, and wherein at least part of the index is created from information obtained by processing each candidate sentence, the processing including extracting one or more words as tokens from each candidate sentence;
   determining an interrogative intent of the sentence, comprising performing a semantic analysis on the sentence;
   for each candidate sentence, determining an aggregate similarity score between the candidate sentence and the sentence, wherein determining the aggregate similarity score includes determining a multi-dimensional token similarity score between one or more tokens of the sentence and one or more corresponding tokens of the candidate sentence, comprising at least two of: an edit distance score, a token similarity score, or an intent similarity score, wherein tokens comprising words specific to the domain category are given a higher weighting value when determining each of the at least two of: an edit distance score, a token similarity score, or an intent similarity score, wherein determining the aggregate similarity score further includes determining an intent similarity score between the determined interrogative intent for the sentence and a determined interrogative intent for the candidate sentence, wherein extracting one or more words as token from the sentence and extracting one or more words as tokens from each candidate sentence further include: determining a position of each token within the sentence and the candidate sentence respectively, and wherein determining the token similarity score includes comparing the position of the one or more tokens of the sentence with the position of the one or more corresponding tokens of the candidate sentence; and
   providing query results corresponding to one or more of the set of candidate sentences ranked based on the determined aggregate similarity scores of each candidate sentence.

2. The method of claim 1, wherein the sentence comprises a phrase, a clause, a partial sentence or a full sentence having at least a subject and an object.

3. The method of claim 1, wherein the similar words for each token are associated with the token in a precompiled dictionary, and wherein determining the aggregate similarity score further includes
   determining a confidence score between the similar words and the one or more corresponding tokens in the candidate sentence.

4. The method of claim 1, wherein extracting one or more words as tokens from the sentence and extracting one or more words as tokens from each candidate sentence further include determining a role and an importance weighting of each token within the sentence and the candidate sentence respectively, and wherein determining the token similarity score further includes comparing the role and the importance weighting of the one or more tokens of the sentence with the role and the importance weighting of the one or more corresponding tokens of the candidate sentence.

5. The method of claim 4, wherein the token similarity score is calculated as a Dice similarity coefficient, a Jaccard similarity coefficient, or a Cosine similarity coefficient.

6. The method of claim 1, wherein determining the edit distance score includes determining a character-level edit distance between characters of the one or more tokens of the sentence and characters of the one or more corresponding tokens of the candidate sentence.

7. The method of claim 6, wherein determining the edit distance score further includes determining a token-level edit distance between the tokens of the sentence and the tokens of the candidate sentence.

8. The method of claim 7, wherein the edit distances are calculated using one or more of a Levenshtein distance, a Longest Common Subsequence (LCS) distance, a Hamming distance, or a Jaro-Winkler distance.

9. A non-transitory machine-readable medium having instructions stored therein, which when executed by a processor, cause the processor to perform operations comprising:

extracting one or more tokens from a sentence received by a search server as a query, each token comprising one or more words, the one or more words forming at least a partial interrogative sentence;

determining, automatically, a domain category for the sentence;

determining a set of candidate sentences having the same domain category as the sentence, wherein the candidate sentences contain one or more of the tokens or one or more similar words to the tokens, wherein the one or more tokens or one or more similar words of each candidate sentence comprise words specific to the domain category, wherein the set of candidate sentences are determined from an index, and wherein at least part of the index is created from information obtained by processing each candidate sentence, the processing including extracting one or more words as tokens from each candidate sentence;

determining an interrogative intent of the sentence, comprising performing a semantic analysis on the sentence;

for each candidate sentence, determining an aggregate similarity score between the candidate sentence and the sentence, wherein determining the aggregate similarity score includes determining a multi-dimensional token similarity score between one or more tokens of the sentence and one or more corresponding tokens of the candidate sentence, comprising at least two of: an edit distance score, a token similarity score, or an intent similarity score, wherein tokens comprising words specific to the domain category are given a higher weighting value when determining each of the at least two of: an edit distance score, a token similarity score, or an intent similarity score, wherein determining the aggregate similarity score further includes determining an intent similarity score between the determined interrogative intent for the sentence and a determined interrogative intent for the candidate sentence, wherein extracting one or more words as token from the sentence and extracting one or more words as tokens from each candidate sentence further include: determining a position of each token within the sentence and the candidate sentence respectively, and wherein determining the token similarity score includes comparing the position of the one or more tokens of the sentence with the position of the one or more corresponding tokens of the candidate sentence; and providing query results corresponding to one or more of the set of candidate sentences ranked based on the determined aggregate similarity scores of each candidate sentence.

10. The medium of claim 9, wherein the sentence comprises a phrase, a clause, a partial sentence, or a full sentence having at least a subject and an object.

11. The medium of claim 9, wherein the similar words for each token are associated with the token in a precompiled dictionary, and wherein determining the aggregate similarity score further includes determining a confidence score between the similar words and the one or more corresponding tokens in the candidate sentence.

12. The medium of claim 9, wherein extracting one or more words as tokens from the sentence and extracting one or more words as tokens from each candidate sentence further include determining a role and an importance weighting of each token within the sentence and the candidate sentence respectively, and wherein determining the token similarity score further includes comparing the role and the importance weighting of the one or more tokens of the sentence with the role and the importance weighting of the one or more corresponding tokens of the candidate sentence.

13. The medium of claim 12, wherein the token similarity score is calculated as a Dice similarity coefficient, a Jaccard similarity coefficient, or a Cosine similarity coefficient.

14. The medium of claim 9, wherein determining the edit distance score includes determining a character-level edit distance between characters of the one or more tokens of the sentence and characters of the one or more corresponding tokens of the candidate sentence.

15. The medium of claim 14, wherein determining the edit distance score further includes determining a token-level edit distance between the tokens of the sentence and the tokens of the candidate sentence.

16. The medium of claim 15, wherein the edit distances are calculated using one or more of a Levenshtein distance, a Longest Common Subsequence (LCS) distance, a Hamming distance, or a Jaro-Winkler distance.

17. A system, comprising:

a processor; and a memory coupled to the processor, the memory storing instructions, which when executed by the processor, cause the processor to perform operations comprising:

extracting one or more tokens from a sentence received by a search server as a query, each token comprising one or more words, the one or more words forming at least a partial interrogative sentence;

determining, automatically a domain category for the sentence;

identifying similar words for each token of the sentence from a precompiled dictionary;

determining a set of candidate sentences having the same domain category as the sentence, wherein the candidate sentences contain one or more of the tokens or one or more of the similar words, wherein the one or more tokens or one or more similar words of each candidate sentence comprise words specific to the domain category, wherein the set of candidate sentences are determined from an index, and wherein at least part of the index is created from information obtained by processing each candidate sentence, the processing including extracting one or more words as tokens from each candidate sentence;

determining an interrogative intent of the sentence, comprising performing a semantic analysis on the sentence;

for each candidate sentence, determining an aggregate similarity score between the candidate sentence and the sentence, wherein determining the aggregate similarity score includes determining a multi-dimensional token similarity score between one or more tokens of the sentence and one or more corresponding tokens of the candidate sentence, comprising at least two of: an edit distance score, a token similarity score, or an intent similarity score, wherein tokens comprising words specific to the domain category are given a higher weighting value when determining each of the at least two of: an edit distance score, a token similarity score, or an intent similarity score, wherein determining the aggregate similarity score further includes determining an intent similarity score between the determined interrogative intent for the sentence and a determined interrogative intent for the candidate sentence, wherein extracting one or more words as token from the sentence and extracting one or more words as tokens from each candidate sentence further include: determining a position of each token within the sentence and the candidate sentence respectively, and wherein determining the token similarity score includes comparing the position of the one or more tokens of the sentence with the position of the one or more corresponding tokens of the candidate sentence; and providing query results corresponding to one or more of the set of candidate sentences ranked based on the determined aggregate similarity scores of each candidate sentence.

18. The system of claim 17, wherein determining the aggregate similarity score further includes determining one or more of an edit distance score between one or more tokens of the sentence and one or more corresponding tokens of the candidate sentence, a confidence score between one or more of the similar words and one or more corresponding tokens of the candidate sentence; and an intent similarity score between a determined intent for the sentence and a determined intent for the candidate sentence.

* * * * *